(12) United States Patent
Bi et al.

(10) Patent No.: US 7,812,485 B2
(45) Date of Patent: Oct. 12, 2010

(54) SHOCK ABSORBING CONNECTOR

(75) Inventors: Ronghua Bi, Zhongshan (CN); Huaxin Wu, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 300 days.

(21) Appl. No.: 11/779,259

(22) Filed: Jul. 17, 2007

(65) Prior Publication Data

US 2008/0143198 A1 Jun. 19, 2008

(30) Foreign Application Priority Data

Dec. 18, 2006 (CN) .................. 2006 2 0155138

(51) Int. Cl.
*H02K 7/14* (2006.01)
(52) U.S. Cl. ............ 310/51; 310/216.121; 310/216.124
(58) Field of Classification Search .................. 310/51, 310/216–218, 254, 258, 259, 254.1
See application file for complete search history.

(56) References Cited

U.S. PATENT DOCUMENTS

| | | | | |
|---|---|---|---|---|
| 4,434,382 A | * | 2/1984 | Patel et al. | 310/51 |
| 5,138,209 A | * | 8/1992 | Chuta et al. | 310/67 R |
| 5,334,895 A | * | 8/1994 | Morioka et al. | 310/67 R |
| 5,461,268 A | * | 10/1995 | Sanada | 310/51 |
| 5,619,389 A | * | 4/1997 | Dunfield et al. | 360/98.07 |
| 5,704,111 A | * | 1/1998 | Johnson et al. | 29/598 |
| 5,798,887 A | * | 8/1998 | Yoshida et al. | 360/99.08 |
| 5,847,476 A | * | 12/1998 | Elsing et al. | 310/51 |
| 5,965,966 A | * | 10/1999 | Aiello et al. | 310/232 |
| 6,281,607 B1 | * | 8/2001 | Petach et al. | 310/51 |
| 6,927,526 B2 | * | 8/2005 | Ishii et al. | 310/261.1 |
| 7,382,068 B2 | * | 6/2008 | Hsu et al. | 310/51 |

* cited by examiner

*Primary Examiner*—Dang D Le
(74) *Attorney, Agent, or Firm*—Matthias Scholl P.C.; Matthias Scholl

(57) ABSTRACT

A motor, including at least a stator core (1), a shaft (2) nested around the stator core (1), and shock-absorbing connector, wherein the shock-absorbing connector is disposed between the stator core (1) and the shaft (2) so as to absorb and buffer unbalanced counterforces acting on the stator core (1) and to dampen the shocks experienced by the shaft (2) and reduce the overall noise generated by the motor.

9 Claims, 11 Drawing Sheets

SHOCK ABSORBING CONNECTOR

CROSS-REFERENCE TO RELATED APPLICATIONS

This application claims priority to Chinese Patent Application No. 200620155138.X filed on Dec. 18, 2006, the contents of which are incorporated herein by reference.

BACKGROUND OF THE INVENTION

1. Field of the Invention

The invention relates to a shock-absorbing device, and more particularly to a shock-absorbing connector for an outer rotor motor and to an outer rotor comprising the shock-absorbing connector.

2. Description of the Related Art

Outer rotor motors of various structures are widely used in many applications. Outer rotor motors, such ceiling fan motors, include a shaft that is normally affixed to a ceiling, and a stator installed on the shaft. As the rotor rotates, forces produced between the rotor and the stator are transferred to the shaft causing the shaft to vibrate and to produce unwanted noise. Therefore, it is required to provide a shock-absorbing connector that absorbs and buffers forces acting on a stator so as to reduce vibrations of the shaft and the noise associated therewith.

SUMMARY OF THE INVENTION

In view of the above-described problems, it is one objective of the invention to provide a shock-absorbing connector that absorbs and buffers imbalanced forces acting on a stator, so as to reduce shock of the shaft and noise of the motor.

To achieve the above objectives, in accordance with one embodiment of the invention, provided is a shock-absorbing connector comprising a stator core and a shaft nested around the stator core.

In certain classes of this embodiment, the shock-absorbing connector is disposed between the stator core and the shaft.

In certain classes of this embodiment, the shock-absorbing connector is an injected rubber block disposed between the stator core and the shaft.

In certain classes of this embodiment, a plurality of grooves for receiving the injected rubber block are disposed on an inner surface of the stator core and an outer surface of the shaft.

In another embodiment, the shock-absorbing connector comprises a shaft sleeve and an injected rubber block.

In certain classes of this embodiment, the shaft is received in a shaft sleeve.

In certain classes of this embodiment, a rubber block is disposed between the shaft sleeve and the stator core.

In certain classes of this embodiment, a pair of retainers is disposed at both ends of the injected rubber block.

In certain classes of this embodiment, the retainers press against the stator core and the shaft sleeve so as to prevent the stator core from moving in an axial direction.

In certain classes of this embodiment, a plurality of grooves for receiving the injected rubber block are disposed on an outer surface of the shaft sleeve and an inner surface of the stator core.

In another embodiment, the shock-absorbing connector comprises a pair of brackets for tightly fixing the shaft and the stator core is disposed between the brackets.

In certain classes of this embodiment, the shaft passes through the stator core, and is not directly mechanically-connected thereto.

In certain classes of this embodiment, a through hole parallel to the shaft is disposed in the stator core.

In certain classes of this embodiment, the shock-absorbing connector further comprises a rubber pad received in the through hole.

In certain classes of this embodiment, the shock-absorbing connector further comprises a rivet passing through the rubber pad received in the through hole, and both ends of the rivet are rivet-connected to the brackets.

In another embodiment, the shock-absorbing connector comprises a shaft sleeve for tightly fixing the shaft.

In certain classes of this embodiment, a plurality of grooves is disposed on an outer surface of the shaft sleeve and an inner surface of the stator core.

In certain classes of this embodiment, the shock-absorbing connector further comprises a plurality of rubber rods disposed inside the grooves.

In certain classes of this embodiment, the shock-absorbing connector further comprises a plurality of rivets received in the rubber rods.

In certain classes of this embodiment, a pair of clamping plates is disposed on an outer surface of the rubber rod.

In certain classes of this embodiment, the rivet is rivet-connected to the clamping plates.

The invention has the following advantages over the prior art. (1) By way of disposing the shock-absorbing connector between the stator core and the shaft, imbalanced forces acting on the stator core are absorbed and buffered. This reduces vibrations of the shaft and noise of the motor and allows the motor to operate stably. (2) The shock-absorbing connector employs in certain embodiment an injected rubber block or a rubber rod along with a pin to connect the stator core to the shaft, which efficiently absorbs shocks produced by the stator core, and thus reduces the vibrations and noise, and prolongs the life time of the motor. The shock-absorbing connector is simple in structure and conveniently applicable to production and mass assembly. (3) The shock-absorbing connector comprises in other embodiments brackets, rubber rods and rivets. The shaft is tightly received inside the brackets. The stator core is disposed between the brackets. The shaft is received in the stator core. A plurality of through holes for receiving the rubber rods is disposed inside the brackets and the stator core. The rivet is received in the rubber rod, and rivet-connected to the brackets. This implementation makes the shock-absorbing connector simple in structure and convenient for mass assembly. Meanwhile, the stator core is fixed in the axial and the radial directions, which reduces its vibrations and noise.

BRIEF DESCRIPTION OF THE DRAWINGS

The objects and advantages of the invention will become more readily apparent after reading the ensuing descriptions of the non-limiting illustrative embodiment and viewing the accompanying drawings, in which.

DETAILED DESCRIPTION OF THE INVENTION

A shock-absorbing connector comprises a stator core 1, a shaft 2 nested around the stator core 1, and a shock-absorbing connector disposed between the stator core 1 and the shaft 2.

Figure 1:
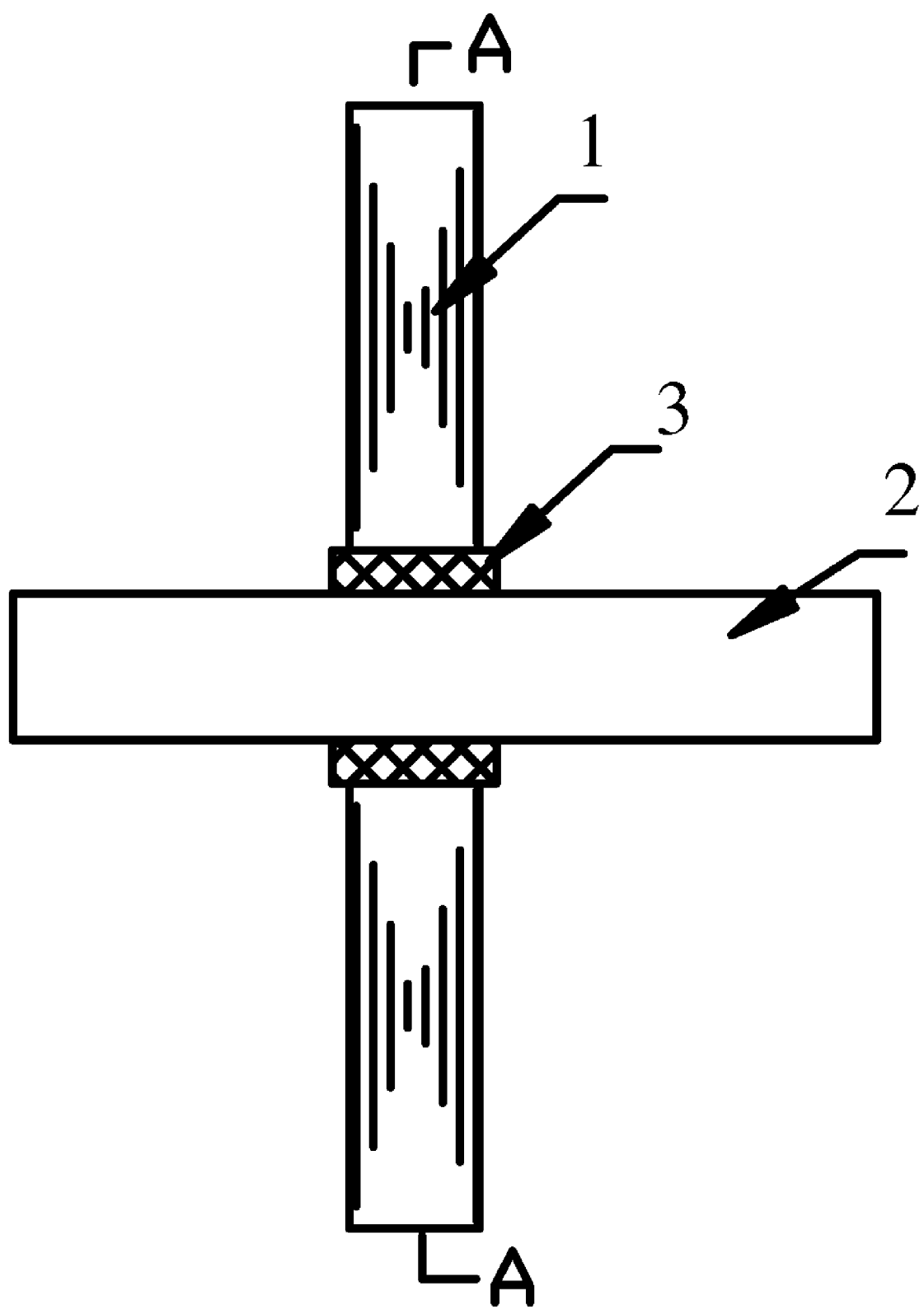
FIG. 1 is a side cross-sectional view of a shock-absorbing connector according to a first embodiment of the invention.
Figure 2:
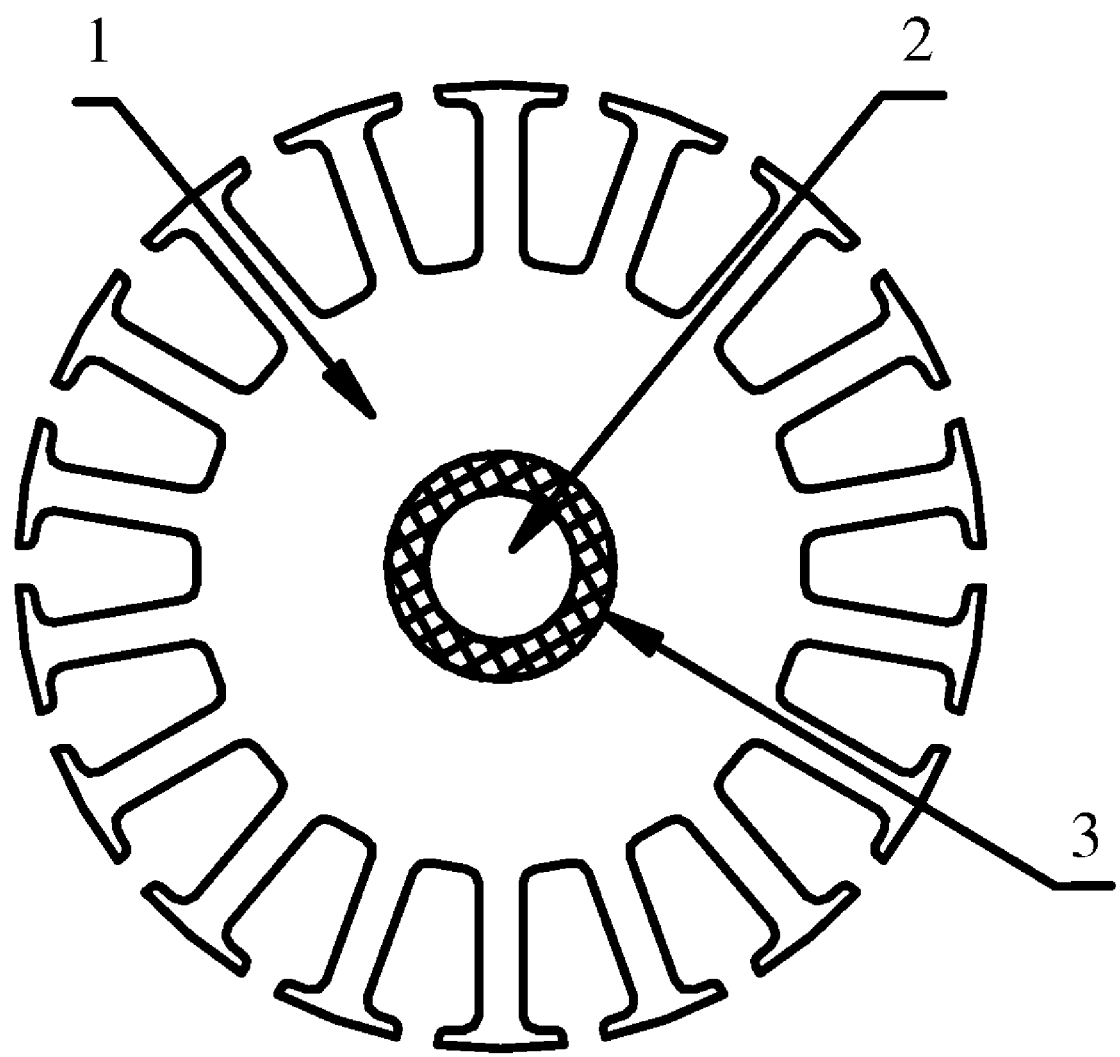
FIG. 2 is a cross-sectional view taken along line A-A of FIG. 1.

As shown in FIGS. 1 and 2, in a first embodiment of the invention, the shock-absorbing connector is an injected rubber block 3 disposed between the stator core 1 and the shaft 2. Mechanical forces exerted on the stator core 1 by the rotor are transferred onto the shaft 2 via the injected rubber block 3. During this process, the injected rubber block 3 absorbs most of the unbalanced forces and in doing so it reduces vibration of the stator core 1 and the shaft 2.

Figure 3:
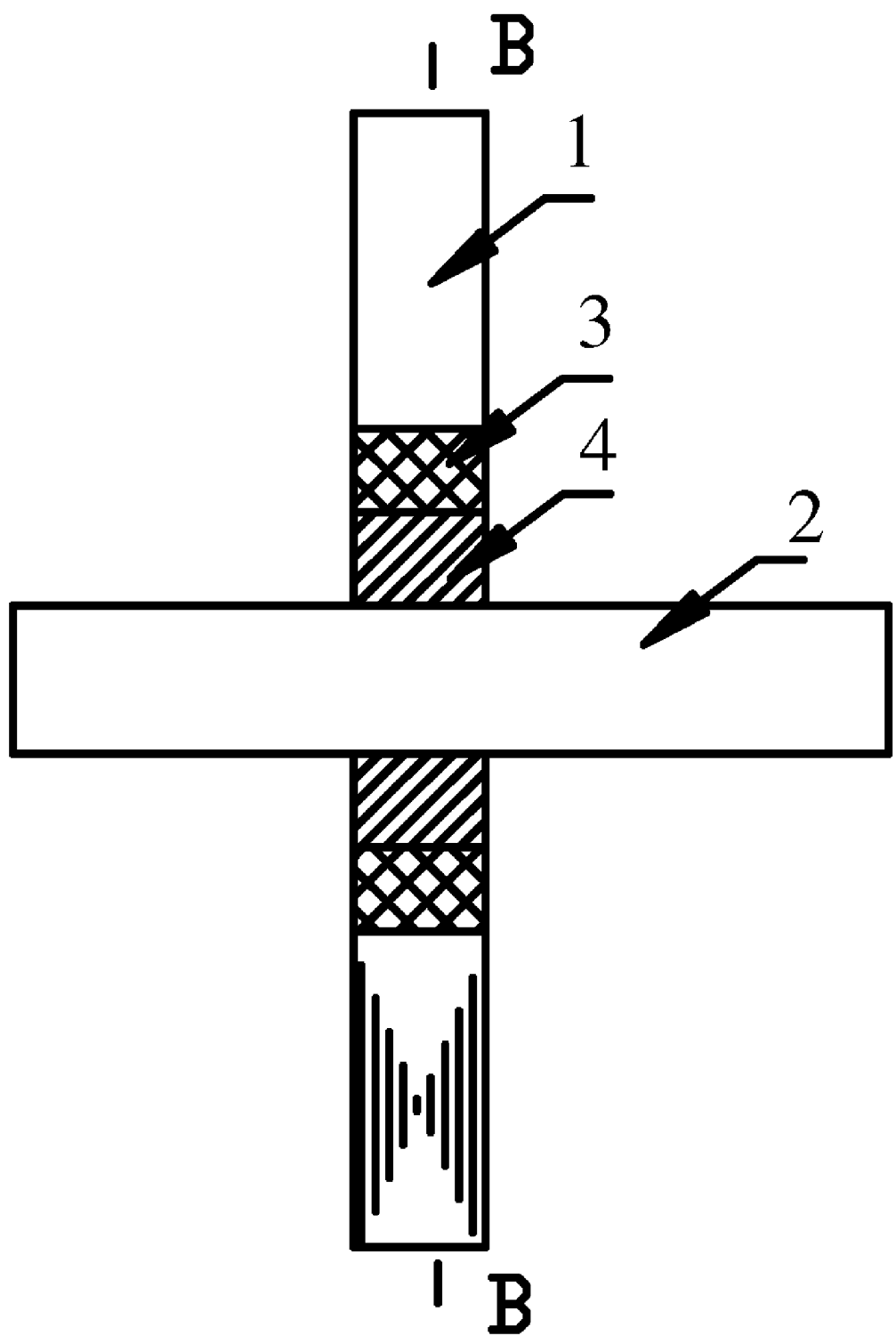
FIG. 3 is a side cross-sectional view of a shock-absorbing connector according to a second embodiment of the invention.
Figure 4:
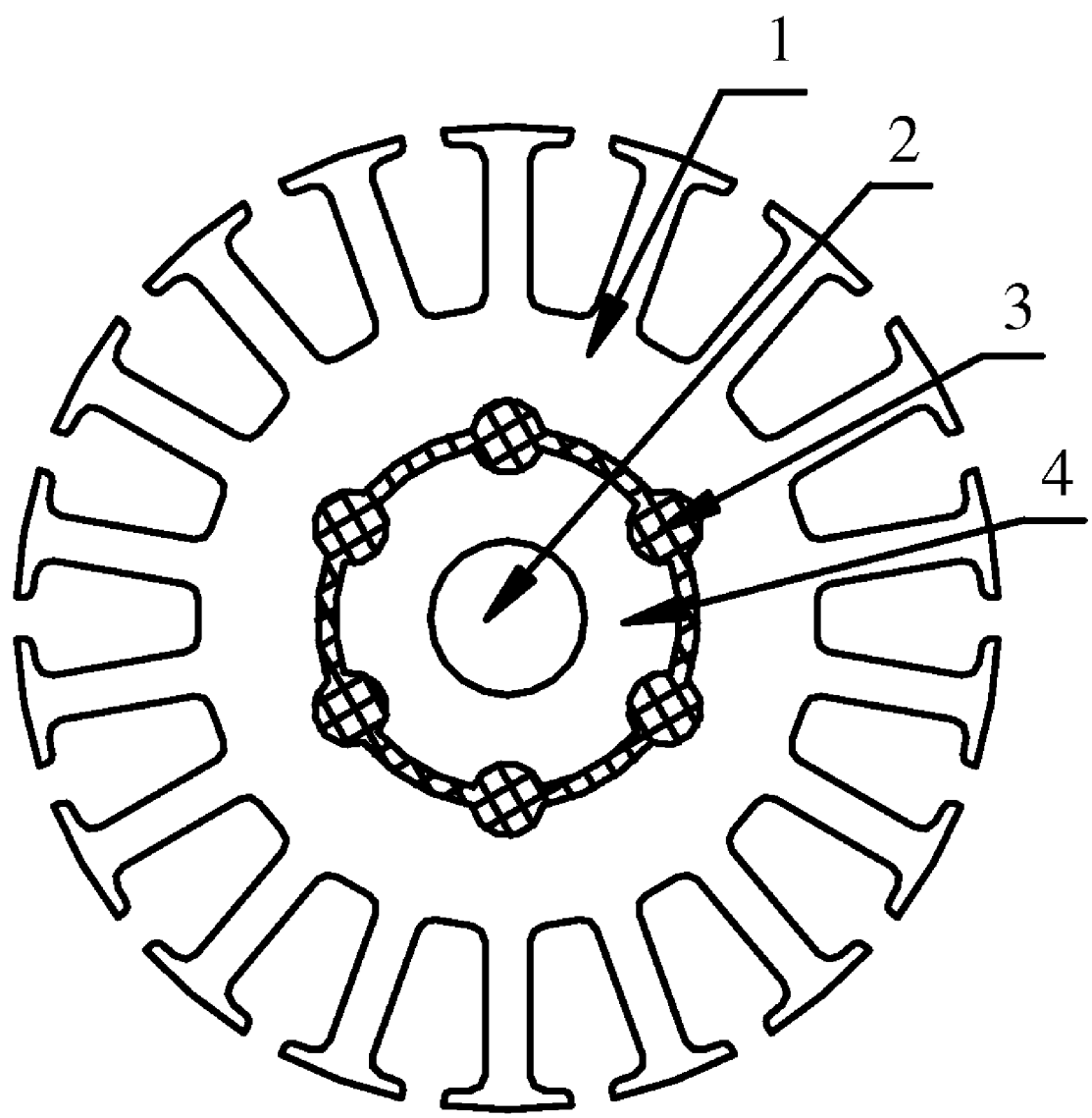
FIG. 4 is a cross-sectional view taken along line B-B of FIG. 3.

As shown in FIGS. 3 and 4, in a second embodiment of the invention, the shock-absorbing connector comprises a shaft sleeve 4 and an injected rubber block 3. The shaft 2 is tightly fixed inside the shaft sleeve 4 and the injected rubber block 3 is disposed between the shaft sleeve 4 and the stator core 1.

Figure 10:
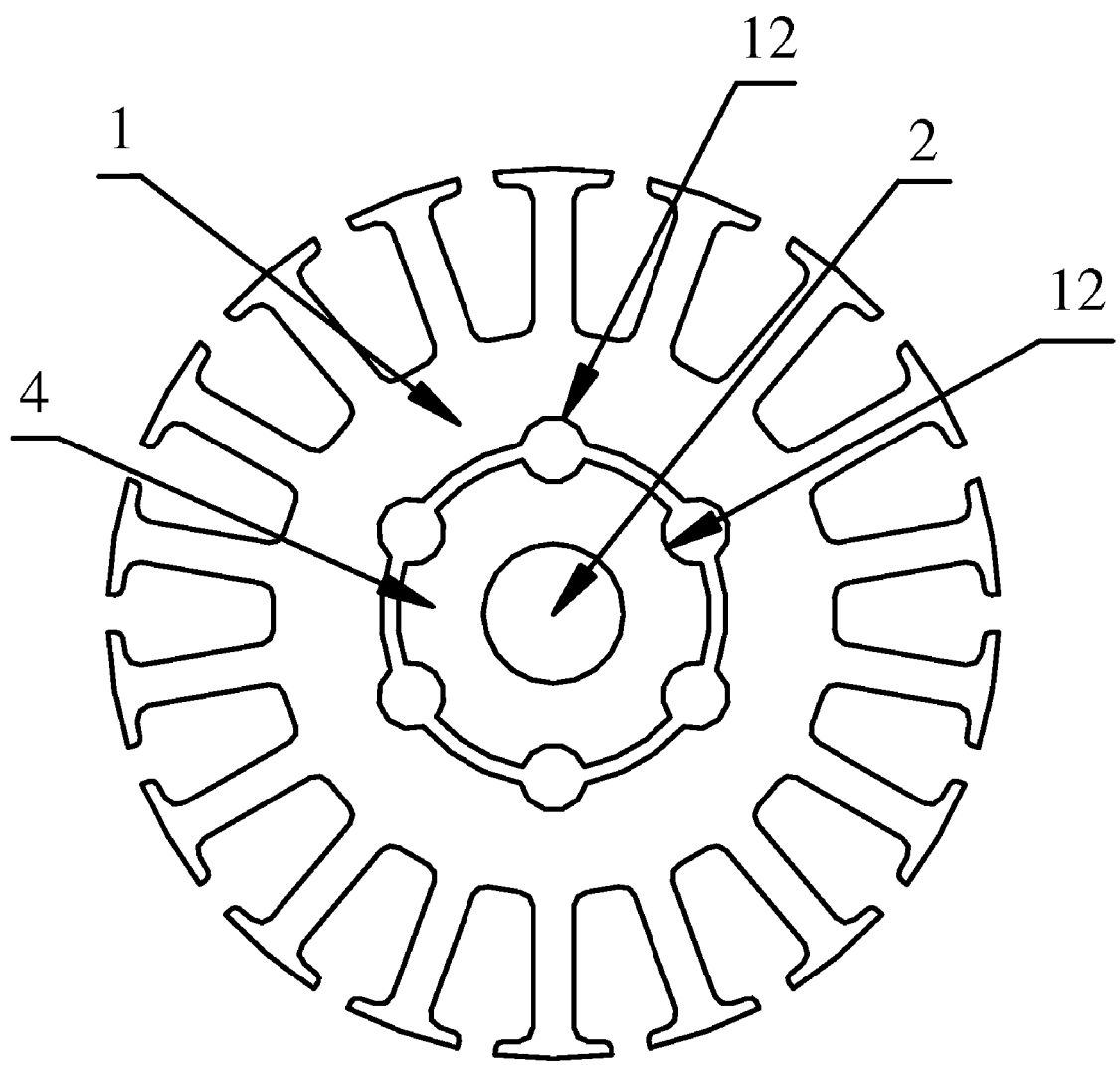
FIG. 10 is a cross-sectional view of a shock-absorbing connector excluding the injected rubber block shown in FIGS. 3-4.

As shown in FIG. 10, a plurality of grooves 12 for receiving the injected rubber block 3 are disposed on an outer surface of the shaft sleeve 4 and an inner surface of the stator core 1. This prevents the injected rubber block 3 from sliding and reduces shock.

Figure 5:
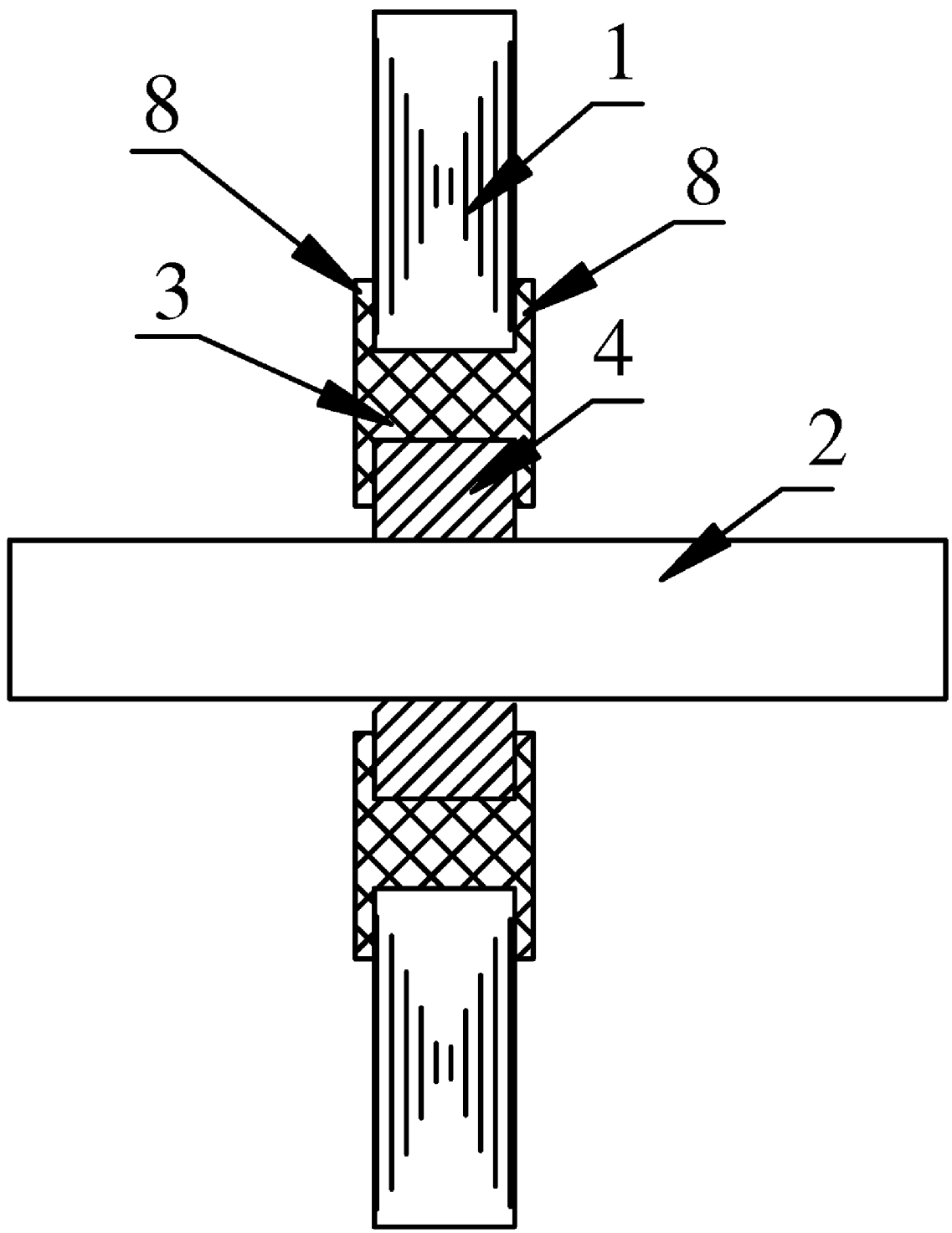
FIG. 5 is a cross-sectional view of a shock-absorbing connector with a pair of retainers according to a second embodiment of the invention.

As shown in FIG. 5, a pair of retainers 8 is disposed at both sides of the injected rubber block 3, and press against the stator core 1 and the shaft sleeve 4 so as to immobilize the stator core 1 and the shaft sleeve 4 in an axial direction with respect to each other. In this way, as the stator core 1 is imposed with unbalanced counterforces, the counterforces will be transferred to the shaft sleeve 4 and the shaft 2 via the injected rubber block 3. During this process, the injected rubber block 3 absorbs most of the unbalanced forces and in doing so it reduces vibration of the stator core 1 and the shaft 2.

Figure 6:
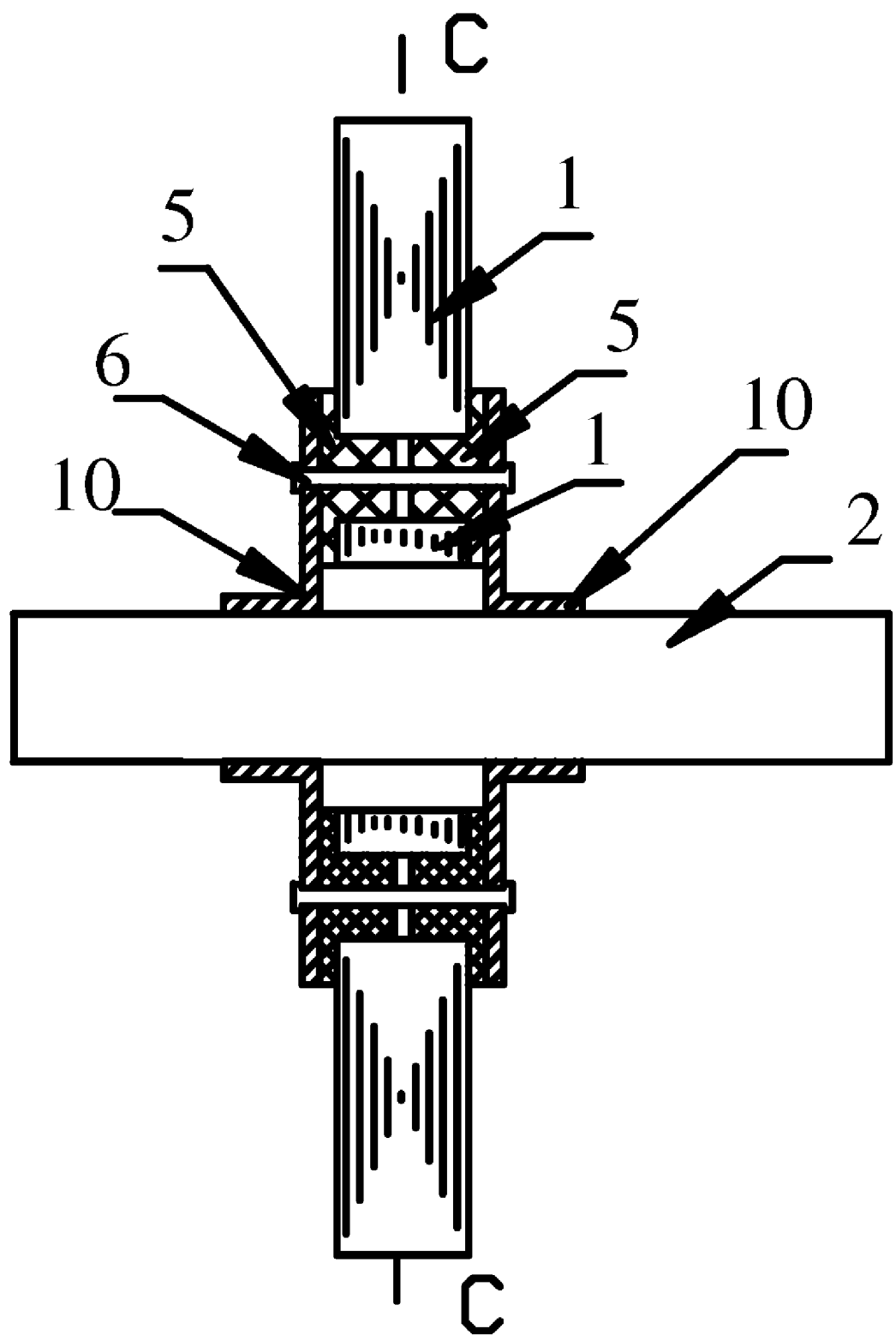
FIG. 6 is a cross-sectional view of a shock-absorbing connector according to a third embodiment of the invention.
Figure 7:
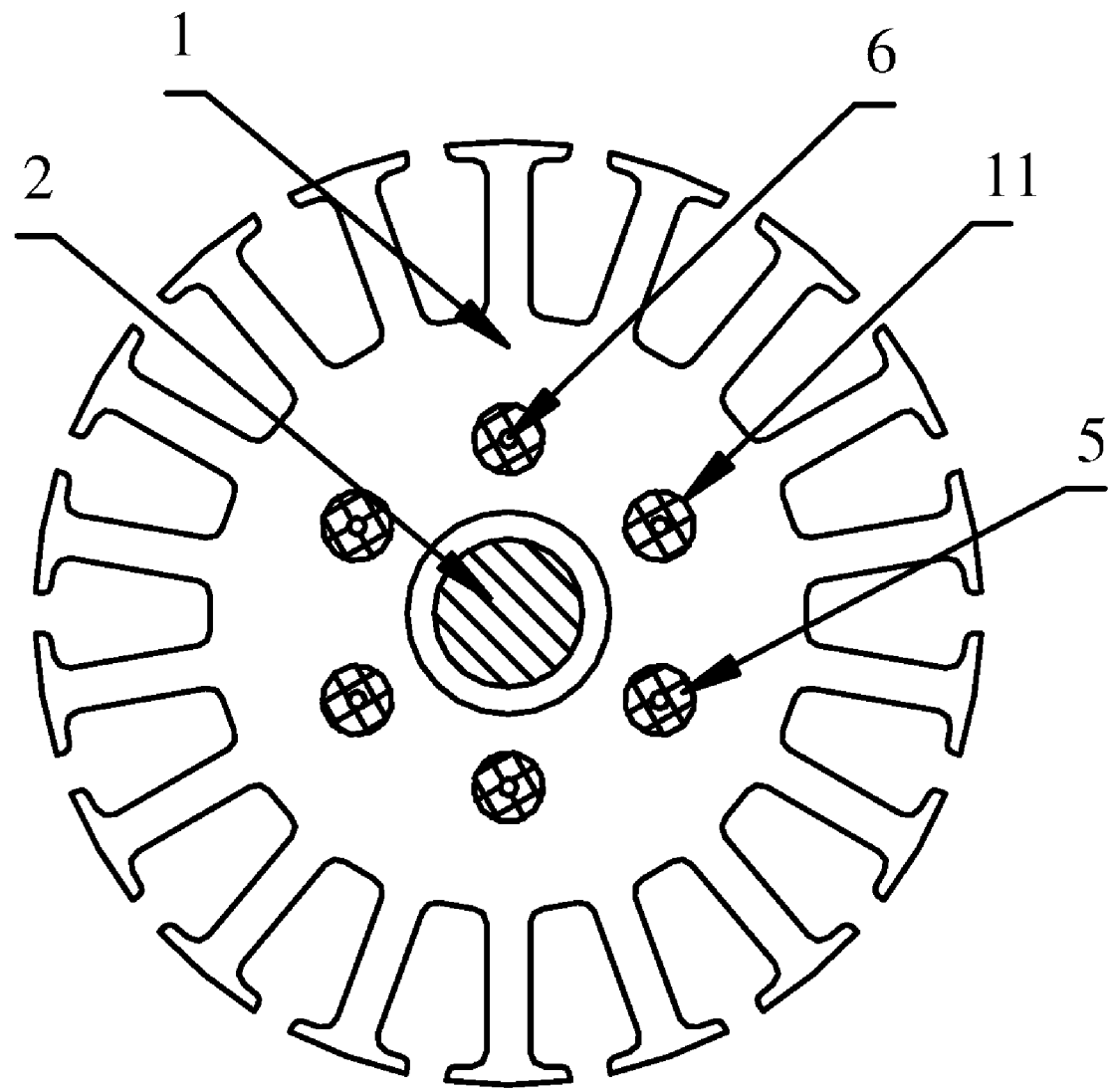
FIG. 7 is a cross-sectional view taken along line C-C of FIG. 6.

As shown in FIGS. 6 and 7, the shock-absorbing connector comprises brackets 10, rubber rods 5, and rivets 6. The shaft 2 is tightly pressed against the brackets 10, and the stator core 1 is disposed between the brackets 10. The shaft 2 passes through the stator core 1, but is not directly mechanically-connected thereto. A through hole 11 for receiving the rubber pad 5 is disposed in the stator core 1. The rivet 6 passes through the rubber rod 5, and is rivet-connected to the brackets 10. In this way, the brackets 10 are indirectly connected to the stator core 1 via the rubber rod 5. As the stator core 1 is imposed with unbalanced counterforces, the counterforces are transferred to the rivet 6 via the rubber rod 5, and then to the brackets 10 and the shaft 2. During this process, the rubber rod 5 absorbs most of the unbalanced forces and in doing so it reduces vibration of the stator core 1 and the shaft 2.

Figure 8:
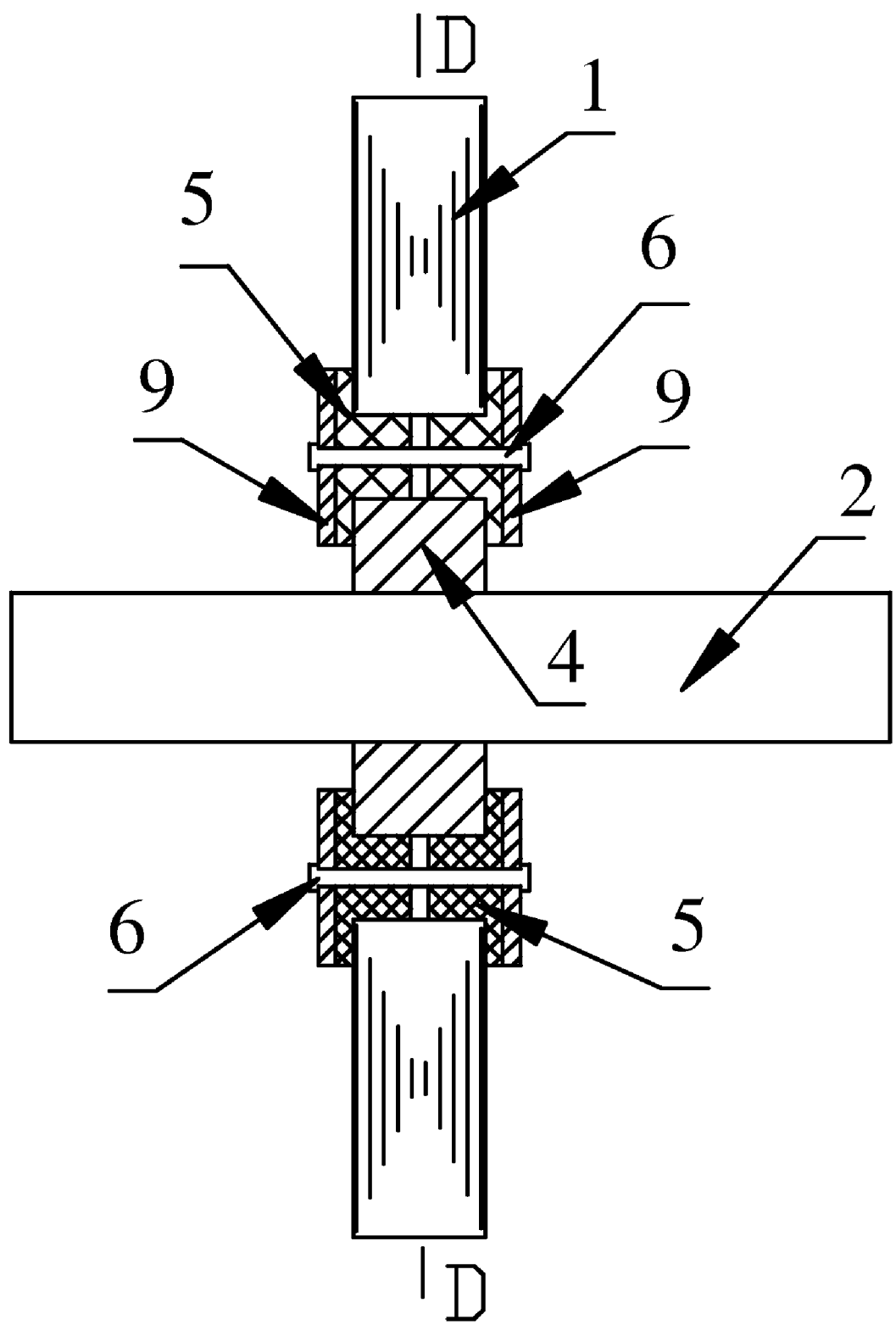
FIG. 8 is a cross-sectional view of a shock-absorbing connector according to a fourth embodiment of the invention.
Figure 9:
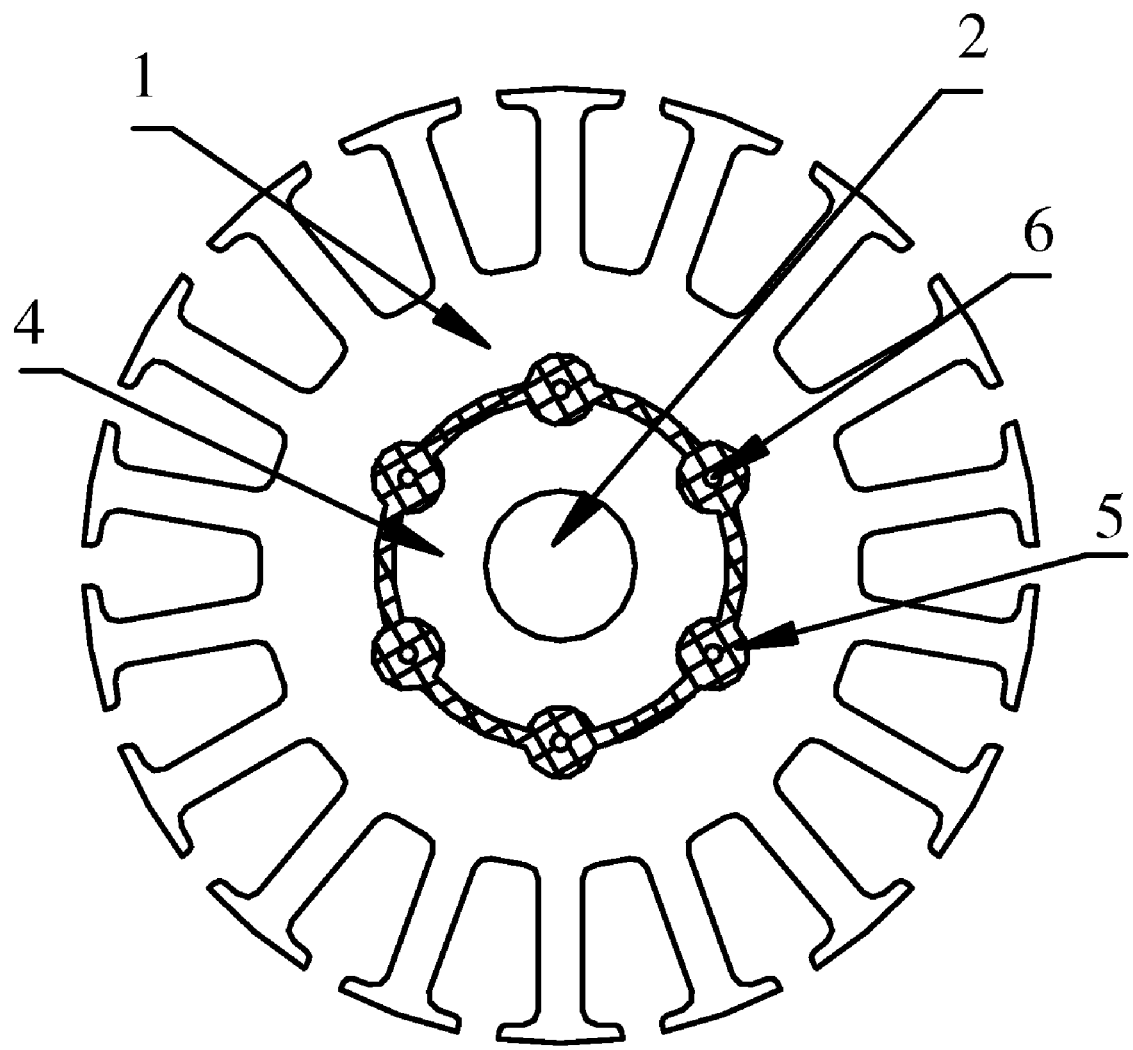
FIG. 9 is a cross-sectional view taken along line D-D of FIG. 8.

As shown in FIGS. 8 and 9, in a fourth embodiment of the invention, the shock-absorbing connector comprises a shaft sleeve 4, a plurality of rubber rods 5 and rivets 6. The shaft 2 is tightly fixed in the shaft sleeve 4. A plurality of grooves 12 for receiving the rubber rods 5 are disposed on an outer surface of the shaft sleeve 4 and an inner surface of the stator core 1, and the rivet 6 passes through the rubber rod 5. A pair of clamping plates 9 is disposed on an outer surface of the rubber rod 5, and the rivet 6 is rivet-connected to the clamping plates 9, so as to fix the stator core 1 and the shaft sleeve 4 together. Alternatively, in the absence of a clamping plate, a part of the rivet 6 protruding out of the stator core 1 may be bent to fix the stator core 1 and the shaft sleeve 4. During this process, the rubber rod 5 absorbs most of the unbalanced counterforces and in doing so it reduces vibration of the stator core 1 and the shaft 2.

Figure 11:
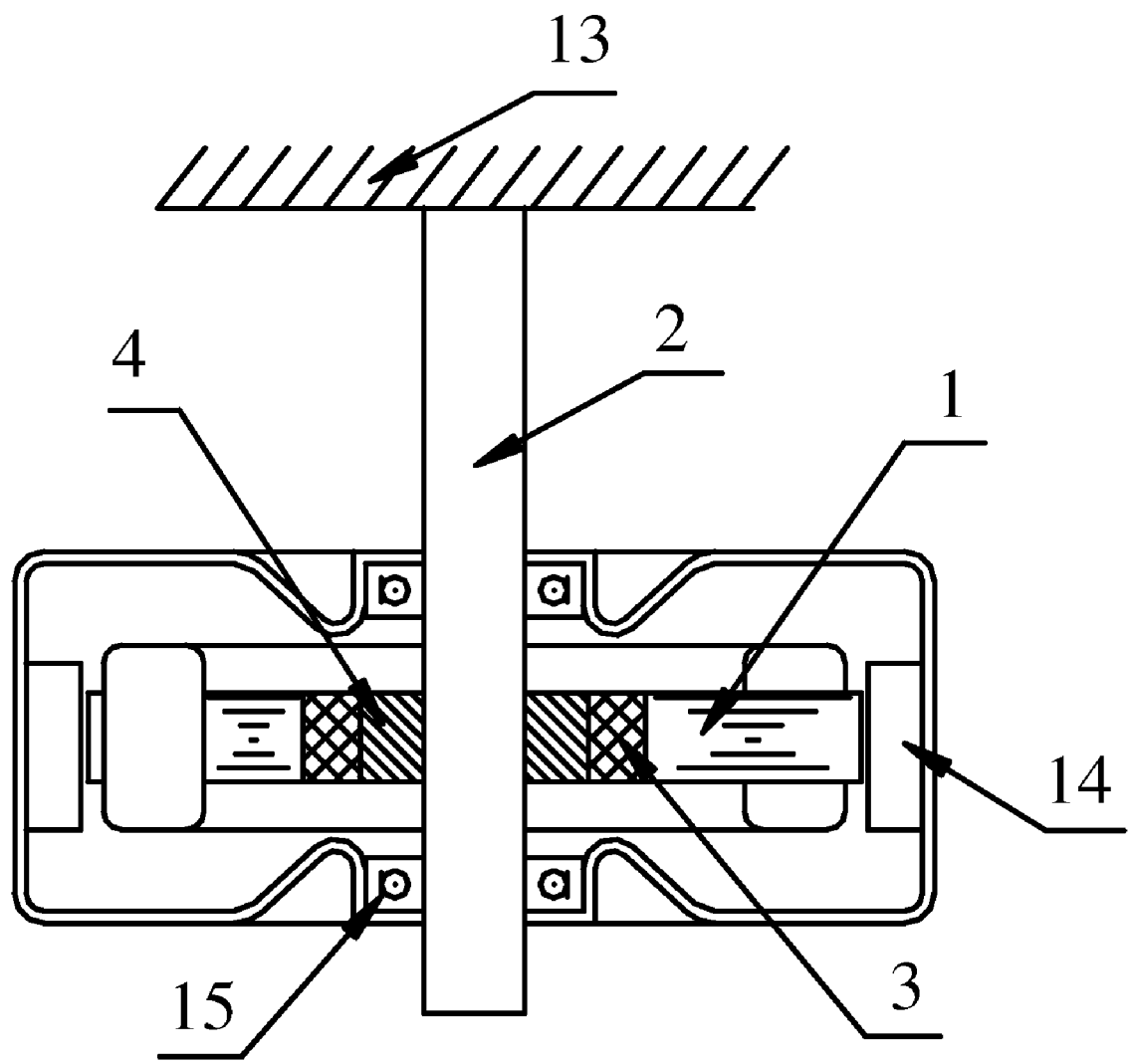
FIG. 11 is a cross-sectional view of a outer rotor motor comprising the shock-absorbing connector of the invention.

As shown in FIG. 11, the shaft 2 is usually affixed to a ceiling. As the rotor 14 rotates around the shaft 2 on the bearing 15, active forces and counterforces are generated between the rotor 14 and the stator core 1. Since the stator core 1 is fixed on the shaft 2 via the shock-absorbing connector, counterforces acting on the stator core 1 are passed to the shaft 2 via the shock-absorbing connector. During this period, the shock-absorbing connector absorbs most of the shock, and it so allows the motor to operate more stably and quietly.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. An electric motor comprising
   a stator core (1);
   a shaft (2) nested in said stator core (1);
   a shock-absorbing connector comprising a rubber block (3) and a shaft sleeve (4), said shaft sleeve (4) being a separate part from said rubber block (3); and
   retainer(s) (8) disposed at both sides of said rubber block (3), wherein
   said shaft (2) is received in said shaft sleeve (4);
   said rubber block (3) is disposed between said shaft sleeve (4) and said stator core (1);
   said shock-absorbing connector is disposed between said stator core (1) and said shaft (2); and
   said retainer(s) (8) are integrally formed with said rubber block and partially surround said stator core (1) and said shaft sleeve (4) in the radial direction.

2. The motor of claim 1, wherein said retainer(s) press against said stator core (1) and said shaft sleeve (4) so as to reduce axial direction movement and/or vibration of said stator core (1).

3. The motor of claim 1, wherein a plurality of grooves (12) for receiving said rubber block (3) are disposed on an outer surface of said shaft sleeve (4) and an inner surface of said stator core (1).

4. The motor of claim 1, wherein a plurality of grooves (12) for receiving said rubber block (3) is disposed on an inner surface of said stator core (1) and an outer surface of said shaft (2).

5. The motor of claim 1, wherein said shock absorbing connector is a single part and does not comprise a metal, and the height of said rubber clock is equal or is greater than the height of the stator core.

6. An electric motor comprising
a stator core (1);
a shaft (2) nested in said stator core (1); and
a shock-absorbing connector comprising a shaft sleeve (4) directly protruding out of said shaft (2), and a plurality of grooves (12) disposed on an outer surface of said shaft sleeve (4) and/or an inner surface of said stator core (1);
wherein said shock-absorbing connector further comprises a plurality of rubber rods (5) disposed inside said grooves (12).

7. The motor of claim 6 wherein said shock-absorbing connector further comprises a plurality of rivets (6) received in said rubber rods (5).

8. The motor of claim 7 wherein clamping plates (9) are disposed on an outer surface of said rubber rod (5) and said clamping plates partially surround said stator core (1) and said shaft sleeve (4) in the radial direction.

9. The motor of claim 8 wherein said rivet (6) is rivet-connected to said clamping plates (9).

\* \* \* \* \*